Aug. 18, 1936.  J. C. SIEGLE  2,051,499
PIPE JOINT
Filed Jan. 25, 1930
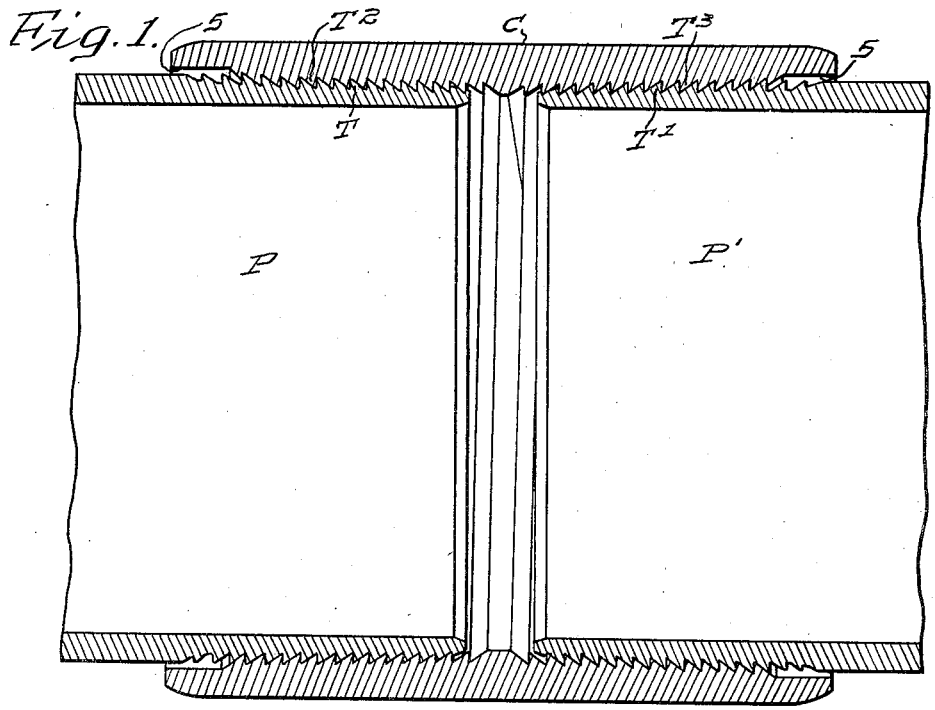
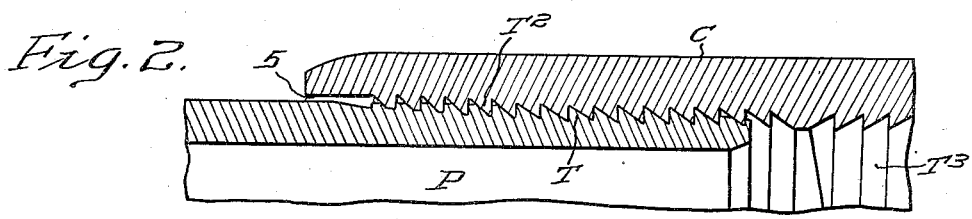
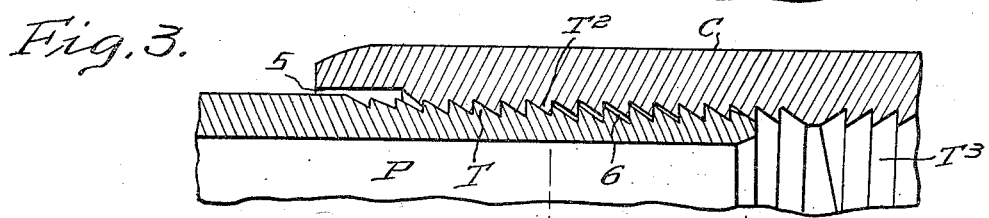
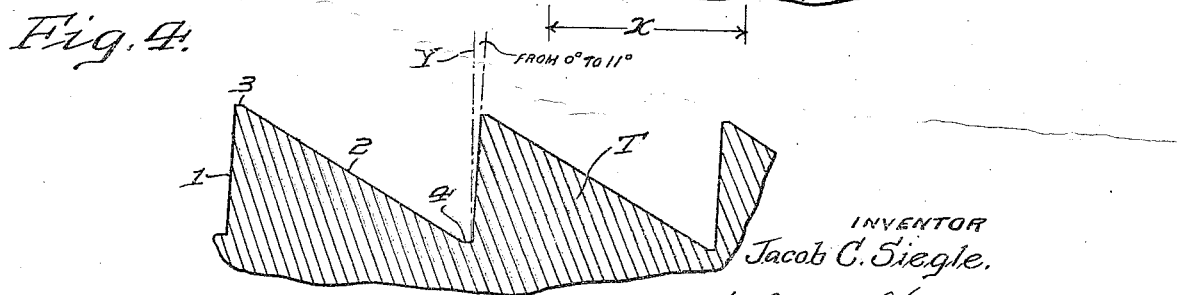
INVENTOR
Jacob C. Siegle.
WITNESS
F. J. Hartman.
ATTORNEYS Patented Aug. 18, 1936

2,051,499

UNITED STATES PATENT OFFICE 2,051,499

PIPE JOINT

Jacob C. Siegle, Youngstown, Ohio

Application January 25, 1930, Serial No. 423,317

1 Claim. (Cl. 285—146)

My invention contemplates the provision of a pipe joint particularly adapted for use where the line of pipe of which it forms a component part, whether axially straight or somewhat curved or bowed, is subjected to longitudinal tension. My improved pipe joint is thus particularly suitable for uniting the sections of oil well casing pipe, since when a string of such pipe is disposed in an oil well many thousand feet in depth, the pipe is subjected to an enormous longitudinal tension or strain, and further, instead of hanging straight in the well, is frequently somewhat curved or bowed in correspondence with the curvature of the well from top to bottom, as it but seldom happens that an oil well is drilled perfectly straight.

When the casing pipe is let down into a well of great depth, the pipe sections and joints are necessarily subjected to an extremely heavy load or duty, and should any failure thereof occur all of the pipe below the point at which the failure takes place may, and frequently does, drop into the well. It has heretofore been the practice to make the threads on the ends of the pipe sections and on the interior of the couplings which serve to unite them of the conventional V-type, and because of the inherent wedge-shaped characteristics of such threads they operate, when set up tightly, to exert a wedging action between the interfitting and cooperating parts which tends to force the pipe couplings outwardly and the pipe inwardly in a generally radial direction, whereby the threads frequently get out of control and the failure occurs. This wedging tendency of the conventional V-thread is especially noticeable where the well is curved instead of being axially straight; under these circumstances the curvature of the well which the pipe must necessarily follow tends to force the couplings away from their adjacent pipe sections, thereby enhancing the wedging action of the interfitting threads and correspondingly increasing the chance of failure.

The principal object of my invention, therefore, is to provide a pipe joint which is not open to the objections to which I have referred and which, therefore, is particularly suitable for use in connecting the sections of oil well casing pipes or of any other pipe lines which are subjected to longitudinal tension and which are either axially straight or slightly curved or bowed from end to end.

A further object of my invention is the provision of a pipe joint of the character aforesaid and embodying a thread of a form which not only facilitates the production of a liquid and mechanically tight joint without the creation of objectionable pressure or wedging action on the interfitting parts, but which in addition provides a maximum degree of support to the subjacent portion of the line when disposed in an oil well or the like.

A still further object of the invention is to provide a pipe joint of the character aforesaid the parts of which may be easily and satisfactorily machined so that the cost of production of the said joint compares favorably with that of the conventional type, thus permitting my improved joints to be utilized as a substitute for the joints heretofore generally employed without material enhancement of the cost of the line of piping as a whole.

Other objects, advantages and novel features of design, construction and arrangement comprehended by my invention will be apparent to those skilled in the art from the following description of certain embodiments thereof as illustrated in the accompanying drawing.

In the said drawing, Fig. 1 is a longitudinal central section of one form of my improved pipe joint as it appears when operatively assembled. Fig. 2 is a similar but fragmentary section showing a part of one end of a slightly different form of the joint on a somewhat larger scale, and Fig. 3 is a similar view showing still another form of the joint. Fig. 4 is a fragmentary and considerably enlarged longitudinal section in any radial plane of a portion of the typical thread employed in the joints and illustrating certain permissible variations therein. The same characters of reference are used to designate similar parts in the several figures.

Referring now more particularly to Fig. 1, it will be noted that the joint therein shown comprises in the usual way a coupling C in the form of a hollow sleeve and which extends between the oppositely disposed juxtaposed ends of two pipe sections P, P' respectively provided with threads T, T¹ of peculiar form and in turn respectively cooperative with corresponding threads T², T³ in the interior of the coupling. These several threads are all of the "buttress" type and thus, as best shown in Fig. 4, comprise, save in certain instances adjacent their outer extremities, an edge or face 1 extending either normal to the axis of the pipe section or coupling, as the case may be, or at a slight angle thereto and another face 2 disposed at a distinct angle to said axis, preferably and as shown in the drawing, an angle of about 30°. The apices of the threads as well as their bottoms, which are respectively formed by intersection of the faces 1 and 2 at the outer extremity of each thread segment and of the face 2 and face 1 of the adjacent segment at the root of the thread, may desirably be slightly flattened as at 3 and 4, while in accordance with the practice usual in the case of pipe threads, the thread on the end of each pipe section is gradually tapered inwardly toward the end of the section and the internal thread on the coupling designed for cooperation therewith similarly inwardly tapered toward the center of the coupling. It will be observed that in the form of the invention to which reference is now being made, the outer ends of the coupling are counterbored or chamfered out as at 5 to a diameter somewhat greater than the exterior diameter of the pipe sections whereby a full or perfect thread extends from the inner end of this chamfer to the center of the coupling. On the other hand, however, the last turn or two of the outer extremity of the thread on each pipe section is not cut to the full depth, so that the thread gradually increases in depth from the surface of the pipe until full depth is attained, thus enhancing the strength of the pipe section at this point beyond that which it would ordinarily have if the thread were cut to full depth for its entire length with resulting production of a sort of shoulder at the outer end of the thread.

In the form of the invention shown in Fig. 2 the coupling is chamfered out to a somewhat greater diameter than the pipe for a suitable distance inwardly from each end as at 5 in the manner already described, but from this point inwardly the thread for several convolutions is cut progressively deeper and deeper until full depth is attained and, in like manner, a substantially corresponding number of convolutions adjacent the outer ends of the threads on the pipe sections are correspondingly progressively deepened as they proceed inwardly until full depth is attained, as clearly shown in said figure. Under these conditions, when the joint is assembled the full depth threads toward the center of the coupling and adjacent the inner ends of the pipe sections will cooperate and interfit, and in like manner the shallow or imperfect threads in the coupling and on each pipe section will similarly cooperate and interfit, so that full interfitting engagement is obtained throughout the entire length of all of the threads, whereas in the form of the invention shown in Fig. 1 the outer convolutions of the threads on the pipe sections have no interfitting engagement with corresponding threads on the coupling.

In the modification shown in Fig. 3 the threads on the coupling are inwardly tapered for their full lengths in the manner already described, but those on the inner ends of the pipe sections are untapered through a short distance or zone X as indicated and beyond or outwardly from said zones are tapered in correspondence with the threads on the coupling; under these conditions a slight clearance 6 occurs between the threads in the coupling and those on the adjacent pipe section near the outer end of the zone X, while a close interfitting engagement is maintained on both sides of said zone. The clearance 6 is necessarily considerably exaggerated in the drawing. As in the case of the joint shown in Fig. 1, the coupling is chamfered out at each end and the threads start at full depth at their outer ends at the inner ends of the chamfers, while the outer convolutions of the threads on the pipe sections are imperfect, that is, not of full depth, but if desired the threads may of course be formed to interfit at their outer extremities as in the form of the invention shown in Fig. 2. Under certain conditions the provision of straight threads at the inner ends of the pipe sections in the manner now being described may be preferred, although a thread such as shown in Figs. 1 and 2 which is fully tapered from one end to the other will generally be found most desirable.

When a series of pipe sections united by my improved joints are disposed in an oil well or the like, the flat or substantially flat sides or faces 1 of the threads in each joint operate substantially as a series of shelves or ledges affording support to the subjacent pipe, and even though the well be considerably out of line and the string of pipe thus correspondingly curved or bowed, the amount of generally radial wedging action exerted by the cooperating threads and which if present would tend to spread or expand the coupling sleeve and to collapse the pipe ends inwardly is substantially negligible. In fact, any such wedging action with resulting tendency to generally radial stresses exerted or which may tend to be exerted by the inclined faces 2 of the threads is overcome or neutralized by the weight of the subjacent string of pipe. It therefore results that my improved joints may be utilized under conditions in which conventional joints having V-type threads are far from satisfactorily operative because of the wedging action exerted by their threads under the longitudinal tension to which the pipe is subjected, particularly if accompanied with axial disalignment with resulting curvature or bending of the line. My improved joints thus may be desirably employed either where the string of pipe is suspended in the well with its lower end above the bottom thereof as is the usual practice, or in those cases in which the lower end of the string of pipe is permitted to rest on the bottom and an upward pull or tension applied to the upper end of the string so as to place all or a portion of the latter in a state of tension, this practice being frequently resorted to in the oil industry.

While the sides or faces 1 of the threads are customarily disposed at a slight angle, for example 2°, to a plane Y normal to the axis of the pipe section or coupling as the case may be, as such disposition tends to facilitate the machining of the threads, the said faces may, if desired, be coincident with said plane or at any angle thereto up to approximately 11°; as this last named angle approximates the friction angle between the parts, it substantially marks the limit to which the inclination of the said faces may be carried.

Threads of the form embodied in my improved joint may be readily formed by a milling or like operation, preferably by the use of a form cutter of length sufficient to complete the full length of each thread when carried once or a little more than once around the pipe section or the interior of the coupling as the case may be, and in accordance with well known practice the axis of the cutter may be disposed parallel to that of the pipe or coupling and the parts moved toward or away from each other to form the taper when cutting taper threads, or the axis of the cutter may be inclined with respect to that of the work in accordance with the taper desired. Furthermore, it will of course be obvious that when forming threads of the character of those shown on the pipe section in Fig. 3, that is, a thread embodying both a straight and a tapered section, the cutter, if intended to form a complete thread in approximately a single orbital or planetary revolution about the work, will of necessity comprise a straight section and a tapered section respectively conforming to the straight and tapered sections of the desired thread. I do not, however, restrict myself to the production of the threads by milling or by milling with any particular form of cutter, as the threads may be cut in a lathe or other suitable machine tool if preferred.

While I have herein described certain forms of my invention with considerable particularity, I do not thereby desire or intend to specifically limit myself thereto as various modifications may be made therein to better adapt the joints for use under specific operating conditions or the like or to meet the individual preferences of users, and the size and relative proportions of the threads with respect to the coupling sleeves and pipe sections as well as the tapers of the threads and the like may be varied as desired, without departing from the spirit and scope of the invention as defined in the appended claim.

Having thus described my invention, I claim and desire to protect by Letters Patent of the United States:

In a pipe joint, a pipe section having on its end a tapered external thread having one face of each of its convolutions lying at an angle less than 90° and not less than 79° to the pipe axis and the other face lying at a lesser angle to said axis, and a tubular section surrounding the threaded end of the pipe section and having an internal tapered thread cooperative with the thread on the pipe section, one face of each convolution of said internal thread lying at an angle less than 90° and not less than 79° to the pipe axis and the other face lying at a lesser angle to said axis, said first mentioned faces of the respective threads forming the mutually engaging faces thereof when the joint is assembled.

JACOB C. SIEGLE.